US012696996B2

(12) United States Patent
Mirbeth et al.

(10) Patent No.: US 12,696,996 B2
(45) Date of Patent: Aug. 4, 2026

(54) APPARATUS AND METHOD FOR PREPARATION OF A BEVERAGE

(71) Applicant: Koninklijke Douwe Egberts B.V., Utrecht (NL)

(72) Inventors: Sebastian Mirbeth, Traunreut (DE); Paul Saxton, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 250 days.

(21) Appl. No.: 18/566,605

(22) PCT Filed: May 23, 2022

(86) PCT No.: PCT/EP2022/063932
§ 371 (c)(1),
(2) Date: Dec. 1, 2023

(87) PCT Pub. No.: WO2022/253617
PCT Pub. Date: Dec. 8, 2022

(65) Prior Publication Data
US 2024/0251985 A1 Aug. 1, 2024

(30) Foreign Application Priority Data
Jun. 1, 2021 (GB) .................................... 2107808

(51) Int. Cl.
*A47J 31/52* (2006.01)
*A23F 5/26* (2006.01)
*A47J 31/44* (2006.01)

(52) U.S. Cl.
CPC ................. *A47J 31/52* (2013.01); *A23F 5/26* (2013.01); *A47J 31/4492* (2013.01)

(58) Field of Classification Search
CPC .......... A47J 31/52; A47J 31/4492; A23F 5/26
(Continued)

(56) References Cited

U.S. PATENT DOCUMENTS 7,856,920 B2 * 12/2010 Schmed .............. A47J 31/3695
99/305
8,109,200 B2 * 2/2012 Hansen .............. B65D 85/8058
99/279
(Continued)

FOREIGN PATENT DOCUMENTS

CN 105555174 5/2016
CN 109270874 1/2019
(Continued)

OTHER PUBLICATIONS

Combined Search and Examination Report, dated Nov. 17, 2021, United Kingdom Patent Application No. GB2107808.4 (7 pgs.).
(Continued)

*Primary Examiner* — Jimmy Chou
(74) *Attorney, Agent, or Firm* — Fitch, Even, Tabin & Flannery LLP

(57) ABSTRACT

A beverage preparation machine (100) comprising: a brew head (101) for receiving in use a cartridge (200), the cartridge (200) being of a type that comprises one or more beverage ingredients and has a code (201) associated with the cartridge (200) for determining a standard set of brewing parameters; a code reader (104); an activation element (102); and a controller (103) configured to control operation of the beverage preparation machine to prepare a beverage from the one or more beverage ingredients of the cartridge (200) in response to actuation of the activation element (102); the controller (103) being configured to receive a user selection to prepare the beverage using at least a first operating mode or a second operating mode; in the first operating mode the beverage is prepared using the standard set of brewing parameters obtained at least in part from reading the code (201) associated with the cartridge (200) received in the brew head; and in the second operating mode the beverage is prepared using a modified set of brewing (Continued)

parameters based on, but modified compared to, the standard set of brewing parameters obtained at least in part from reading the code (201) associated with the cartridge (200) received in the brew head; wherein the activation element (102) comprises a single manually actuatable pushbutton, switch and/or button; and the controller (103) and the activation element (102) are configured to permit user selection of the first operating mode by a first type of actuation of the activation element (102) and the second operating mode by a second type of actuation of the activation element (102).

19 Claims, 7 Drawing Sheets

(58) Field of Classification Search
USPC .......................................................... 99/295
See application file for complete search history.

(56) References Cited

U.S. PATENT DOCUMENTS

| | | | | |
|---|---|---|---|---|
| 8,916,215 | B2 * | 12/2014 | Yoakim | B65D 85/8055 |
| | | | | 426/77 |
| 8,919,240 | B2 * | 12/2014 | Ozanne | A47J 31/4492 |
| | | | | 99/295 |
| 9,027,466 | B2 * | 5/2015 | Bucher | A47J 31/3623 |
| | | | | 99/280 |
| 2004/0197444 | A1 | 10/2004 | Halliday | |
| 2005/0150391 | A1 * | 7/2005 | Schifferle | A47J 31/3695 |
| | | | | 99/295 |
| 2008/0245236 | A1 * | 10/2008 | Ternite | A47J 31/3623 |
| | | | | 99/295 |
| 2009/0229475 | A1 * | 9/2009 | Bally | F24C 7/08 |
| | | | | 99/337 |
| 2010/0263546 | A1 * | 10/2010 | Leuzinger | A47J 31/4492 |
| | | | | 99/302 R |
| 2011/0048240 | A1 * | 3/2011 | Siu | A47J 31/18 |
| | | | | 99/285 |
| 2011/0212229 | A1 * | 9/2011 | Mclaughlin | A47J 31/3614 |
| | | | | 99/283 |
| 2012/0097041 | A1 * | 4/2012 | Bucher | B65D 85/8058 |
| | | | | 426/106 |
| 2012/0100264 | A1 * | 4/2012 | Bucher | B65D 85/8058 |
| | | | | 426/106 |
| 2012/0164295 | A1 * | 6/2012 | Hansen | A47J 31/0605 |
| | | | | 261/30 |
| 2012/0295234 | A1 * | 11/2012 | Rognon | A47J 31/3623 |
| | | | | 434/127 |
| 2013/0064937 | A1 * | 3/2013 | Jarisch | B65D 85/8058 |
| | | | | 426/112 |
| 2013/0129876 | A1 * | 5/2013 | Ye | A47J 31/3638 |
| | | | | 426/232 |
| 2013/0236609 | A1 * | 9/2013 | Magniet | A47J 31/369 |
| | | | | 426/87 |
| 2013/0340626 | A1 * | 12/2013 | Oh | A23F 3/18 |
| | | | | 426/115 |
| 2014/0290493 | A1 | 10/2014 | Rivera | |
| 2015/0216353 | A1 * | 8/2015 | Polti | A47J 31/407 |
| | | | | 426/433 |
| 2015/0257586 | A1 | 9/2015 | Dinucci | |
| 2016/0242594 | A1 * | 8/2016 | Empl | A47J 31/4492 |
| 2016/0302612 | A1 * | 10/2016 | De Vreede | A47J 31/4403 |
| 2016/0309953 | A1 * | 10/2016 | De Vreede | A47J 31/4403 |
| 2019/0021543 | A1 * | 1/2019 | Accursi | A47J 31/4492 |
| 2019/0142216 | A1 * | 5/2019 | Huang | A47J 37/0664 |
| | | | | 99/348 |

FOREIGN PATENT DOCUMENTS

| | | | | |
|---|---|---|---|---|
| CN | 111295117 | 6/2020 | | |
| DE | 102015106176 A1 * | 10/2016 | | A47J 31/52 |
| EP | 2085000 | 8/2009 | | |
| EP | 3275345 | 1/2018 | | |
| EP | 3275345 A1 * | 1/2018 | | A47J 31/3623 |
| GB | 2475291 | 5/2011 | | |
| WO | 2015004551 | 1/2015 | | |
| WO | 2015091193 | 6/2015 | | |
| WO | 2019086472 | 5/2019 | | |

OTHER PUBLICATIONS

International Search Report and Written Opinion, date of mailing Sep. 16, 2023, International Appliction No. PCT/2022/063932 (11 pgs.).

Chinese Office Action, dated Feb. 12, 2026, Chinese Patent Application No. 202280036796.9, with English translation (12 pgs.).

* cited by examiner

APPARATUS AND METHOD FOR PREPARATION OF A BEVERAGE

CROSS REFERENCE TO RELATED APPLICATIONS

This application is a U.S. national phase application of International Application No. PCT/EP2022/063932, filed May 23, 2022, which claims benefit from United Kingdom Application 2107808.4, filed Jun. 1, 2021, which are each hereby incorporated herein by reference in their entirety.

TECHNICAL FIELD

This disclosure relates to a beverage preparation machine for preparing beverages from beverage cartridges containing roast and ground beverage ingredients, and a method of doing the same. In particular, the disclosure relates to a simple system for increasing beverage intensity without a large reduction in beverage volume while reducing waste.

BACKGROUND

Beverage preparation machines for production of beverages using beverage ingredients contained in cartridges (which expression in the present specification encompasses cartridges, capsules, pods, sachets or similar) are well known. Such machines may prepare all beverages using a single set of brewing parameters, or may prepare beverages using brewing parameters specific to the type of cartridge inserted into the machine. For example, the machine may identify the type of cartridge based on a code arranged on the cartridge itself.

Increasingly, consumers wish to customise or personalise the beverages produced by such machines. In particular, customers may wish to vary the intensity of the beverage, for example to produce a stronger cup of coffee. Options for customisation may be provided by way of a screen interface or via an internet connection to an external device such as a mobile phone. However, such controls lead to an increase in complexity and cost in the beverage preparation machine. In addition, the large number of parameters to be controlled in preparing a beverage may result in the consumer being presented with a confusing array of options for beverage preparation.

The problems of customisation are particularly relevant for the production of beverages using roast and ground beverage ingredients, for example roast and ground coffee, for which consumers may have a particular preference for a more or less intense beverage, and for which a large number of beverage preparation parameters may contribute to the qualities of the beverage produced.

Providing a more intense beverage may be easily achieved in a non-cartridge type beverage preparation machine which does not use a cartridge, but rather makes use of a reservoir of coffee beans or roast and ground coffee. In such a machine, the production of a more intense beverage can be achieved by using more of the coffee beans or ground coffee in production of a single cup. In contrast, in a cartridge-type beverage preparation machine the beverage ingredient is contained within a pre-filled and sealed cartridge and so the serving size is fixed and cannot be altered by the consumer.

To increase the intensity of the beverage, existing machines may substantially reduce the volume of liquid used to produce the beverage, thereby producing a smaller serving size of a more intense beverage. For example, existing systems may reduce the beverage volume by 50% to achieve a more intense beverage. This may lead to increased waste, as the consumer may use multiple cartridges to obtain a beverage of their preferred in-cup volume, meaning both more coffee and more packaging is associated with producing the preferred beverage size.

It would be desirable to provide a simple means of allowing the user to select a more intense beverage which limits waste and does not result in a large volume reduction in the beverage when compared to a "standard" beverage prepared from the same cartridge. This may be of particular interest when producing beverages to which milk is to be added, increased coffee intensity may be desired when milk is to be added.

SUMMARY OF DISCLOSURE

According to a first aspect of the disclosure there is provided a beverage preparation machine comprising:

a brew head for receiving in use a cartridge, the cartridge being of a type that comprises one or more beverage ingredients and has a code associated with the cartridge for determining a standard set of brewing parameters;

a code reader;

an activation element; and a controller configured to control operation of the beverage preparation machine to prepare a beverage from the one or more beverage ingredients of the cartridge in response to actuation of the activation element;

the controller being configured to receive a user selection to prepare the beverage using at least a first operating mode or a second operating mode;

in the first operating mode the beverage is prepared using the standard set of brewing parameters obtained at least in part from reading the code associated with the cartridge received in the brew head; and in the second operating mode the beverage is prepared using a modified set of brewing parameters based on, but modified compared to, the standard set of brewing parameters obtained at least in part from reading the code associated with the cartridge received in the brew head;

wherein the activation element comprises a single manually actuatable pushbutton, switch and/or button; and the controller and the activation element are configured to permit user selection of the first operating mode by a first type of actuation of the activation element and the second operating mode by a second type of actuation of the activation element.

In the beverage preparation machine of the first aspect, one or more of the following features may be present:

The controller may be configured to de-activate the second operating mode when the controller determines that the one or more beverage ingredients of the cartridge does not include one or more roast and ground beverage ingredients such that the beverage is prepared using the first operating mode irrespective of the type of actuation of the activation element.

The controller may be configured to determine whether the one or more beverage ingredients of the cartridge includes one or more roast and ground beverage ingredients based on data obtained from reading the code associated with the cartridge received in the brew head.

The controller may be configured to determine whether the one or more beverage ingredients of the cartridge includes one or more roast and ground beverage ingredients on insertion of the cartridge into the brew head and prior to actuation of the activation element.

The activation element may comprise an indicator for indicating whether the second operating mode is available for selection and/or is operative during preparation of the beverage.

The first type of actuation may be a short press of the activation element and the second type of actuation may be a long press of the activation element.

The short press may have a duration of less than 3 seconds, optionally less than 2 seconds, optionally less than 1 second and the long press may have a duration of 3 seconds or greater, optionally of 5 seconds or greater.

The modified set of brewing parameters may comprise one or more of:

a) a pre-wet temperature parameter that is increased compared to a pre-wet temperature parameter of the standard set of brewing parameters;

b) a soak duration parameter that is extended compared to a soak duration parameter of the standard set of brewing parameters;

c) a total in-cup volume parameter that is reduced compared to a total in-cup volume parameter of the standard set of brewing parameters.

The pre-wet temperature parameter of the modified set of brewing parameters may be from substantially 3° C. to substantially 8° C. higher than the pre-wet temperature of the standard set of brewing parameters.

The soak duration parameter of the modified set of brewing parameters may be 3 to 12 seconds, optionally 5 to 10 seconds, longer than the soak duration parameter of the standard set of brewing parameters.

The total in-cup volume parameter of the modified set of brewing parameters may be 10% to 15% less than the total in-cup volume parameter of the standard set of brewing parameters.

The modified set of brewing parameters may comprise one or more of the following parameters that are unchanged compared to the standard set of brewing parameters:

brewing temperature parameter; and brewing flow rate parameter.

According to a second aspect of the disclosure there is provided a method of operating a beverage preparation machine comprising the steps of:

a) inserting a cartridge into the beverage preparation machine, the cartridge being of a type that comprises one or more beverage ingredients and has a code associated with the cartridge for determining a standard set of brewing parameters;

b) receiving a user selection commanding preparation of a beverage using:

i) a first operating mode wherein the beverage is prepared using the standard set of brewing parameters obtained at least in part from the code associated with the cartridge; or ii) a second operating mode wherein the beverage is prepared using a modified set of brewing parameters that are based on, but modified compared to, the standard set of brewing parameters obtained at least in part from reading the code associated with the cartridge;

c) preparing the beverage using the first or the second operating mode;

wherein the user selection is received by actuating an activation element that comprises a single manually actuatable pushbutton, switch and/or button; and the first operating mode is selected by actuating the pushbutton, switch and/or button using a first type of actuation and the second operating mode is selected by actuating the same pushbutton, switch and/or button using a second type of actuation.

In the method of the second aspect, one or more of the following features may be present:

The second operating mode may be deactivated when the one or more beverage ingredients of the cartridge does not include one or more roast and ground beverage ingredients such that the beverage is prepared using the first operating mode irrespective of the user selection made using the activation element.

The beverage preparation machine may determine whether the one or more beverage ingredients of the cartridge includes one or more roast and ground beverage ingredients based on data obtained from reading a code associated with the cartridge.

The beverage preparation machine may determine whether the one or more beverage ingredients of the cartridge includes one or more roast and ground beverage ingredients on insertion of the cartridge and prior to actuation of the activation element.

The first type of actuation may be a short press of the pushbutton, switch and/or button and the second type of actuation may be a long press of the pushbutton, switch and/or button.

The modified set of brewing parameters may comprise one or more of:

a) a pre-wet temperature parameter that is increased compared to a pre-wet temperature parameter of the standard set of brewing parameters;

b) a soak duration parameter that is extended compared to a soak duration parameter of the standard set of brewing parameters;

c) a total in-cup volume parameter that is reduced compared to a total in-cup volume parameter of the standard set of brewing parameters.

The pre-wet temperature parameter of the modified set of brewing parameters may be from substantially 3° C. to substantially 8° C. higher than the pre-wet temperature of the standard set of brewing parameters.

The soak duration parameter of the modified set of brewing parameters may be 3 to 12 seconds, optionally 5 to 10 seconds, longer than the soak duration parameter of the standard set of brewing parameters.

The total in-cup volume parameter of the modified set of brewing parameters may be 10% to 15% less than the total in-cup volume parameter of the standard set of brewing parameters.

The modified set of brewing parameters may comprises one or more of the following parameters that are unchanged compared to the standard set of brewing parameters:

brewing temperature parameter; and brewing flow rate parameter.

The first operating mode may prepare a brewed coffee beverage of a relatively weaker intensity and the second operating mode may prepare a brewed coffee beverage of a relatively stronger intensity.

The present disclosure will now be further described. In the following passages different aspects of the disclosure are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In any aspect of the present disclosure, the activation element of the beverage preparation machine comprises a single manually actuatable pushbutton, switch and/or button. Preferably, the pushbutton, switch and/or button may comprise a simple input device, most preferably in the form of a physical button (as opposed to a touchscreen button). More preferably, the activation element may comprise the only user control element for controlling the brewing process of the beverage preparation machine.

The activation element is configured to be actuated in a first type of actuation or a second type of actuation. The first type of actuation may be a relatively shorter press and the second type of actuation may be a relatively longer press of the actuation element (or vice versa). Alternatively, the types of actuation may comprise alternative distinct actuation types, for example a single press and a repeated press, or pressing of different parts of the single activation element.

Optionally, the code associated with the cartridge may be a barcode, QR code, or any other alternative suitable for providing data allowing identification of the cartridge. The code may be associated with the cartridge by any suitable means, for example, printing, providing an insert within the cartridge, providing a sticker or other element for attachment to or otherwise association with the cartridge. The code may be provided on or in any part of the cartridge, for example the lid or a body of the cartridge.

In any aspect of the present disclosure, determining the standard set of brewing parameters may comprise comparing data obtained from reading the code to a database comprising standard brewing parameters for each of a plurality of types of cartridge. Preferably, the database may be stored in the beverage preparation machine, for example in a computer memory connected to the controller, such that no network or internet connection is required and the beverage preparation method can be achieved entirely within the machine. The database may comprise data indicating (explicitly or implicitly) whether the type of cartridge identified contains roast and ground beverage ingredients, preferably whether the type of cartridge identified contains roast and ground coffee. Means may be provided for periodic updating of the database, for example during maintenance.

In a preferred aspect of the present disclosure, the code is read by the code reader on insertion of the cartridge and prior to actuation of the activation element, such that the controller can determine (explicitly or implicitly) whether the one or more beverage ingredients of the cartridge includes one or more roast and ground beverage ingredients based on data obtained from reading the code and subsequently deactivate the second operating mode before actuation of the activation element. Alternatively or additionally, the beverage preparation machine may be configured to read the code during and/or after actuation of the activation element by the user. In any of these aspects, the controller may be configured to deactivate the second operating mode (and thereby disregard the user selection) and proceed in the first operating mode in response to the actuation if the second mode is selected by the user and the data obtained from reading the code indicates that the beverage ingredients within the cartridge do not comprise one or more roast and ground beverage ingredients.

In any aspect of the present disclosure, determination of whether the one or more beverage ingredients of the cartridge includes one or more roast and ground beverage ingredients based on data obtained from reading the code may be explicit or implicit, and may be carried out by any suitable method. For example, the code may contain a flag or data bit that is used to signify that one or more roast and ground beverage ingredients are present. Alternatively, a database may comprise a list of capsule types for which the second operating mode can be used. Alternatively, the controller infer that one or more roast and ground beverage ingredients are present based on the state of other parameters derived from the code, e.g. the presence/length of a pre-wet and/or soak step.

In a preferable aspect of the present disclosure an indicator is provided. The indicator may be in the form of an LED or another suitable illuminated component. The indicator may provide various indications, for example the availability of the second operating mode (for example, as determined based on the data derived from the code as described above), an error state and/or another operational state of the beverage preparation machine. The indicator may provide various indications by variation in colour and/or duration of illumination. The indicator may comprise one or more indication elements for providing the required indications. Each indication element may be in the form of an LED or another suitable illuminated component.

In a preferred aspect of the present disclosure, the first operating mode prepares a brewed coffee beverage of a relatively weaker intensity and the second operating mode prepares a brewed coffee beverage of a relatively stronger intensity. Alternatively, the first operating mode may prepare a brewed coffee beverage of a relatively stronger intensity and the second operating mode may prepare a brewed coffee beverage of a relatively weaker intensity.

The apparatus and methods of the present disclosure may allow for overriding a standard brew cycle associated with a particular type of cartridge to use modified parameters producing a varied beverage, preferably a beverage of stronger intensity, without a large change in beverage volume and without increasing waste.

The modified brewing parameters may be modified so as to increase extraction from the beverage ingredients and to increase an amount of soluble solids delivered to the beverage in cup. The increase in beverage intensity may be achieved by adjustment to one or more of at least pre-wet/ soak, brew temperature and/or in-cup volume parameters to increase the soluble solids extracted from the beverage ingredients.

Optionally, some brewing parameters associated with the brewing process may remain unmodified in the modified set of brewing parameters. For example, the brewing temperature parameter and/or brewing flow rate parameter may be unmodified in the modified set of brewing parameters. It may be beneficial to avoid modification of the brewing flow rate, as reduction in flow rate may reduce crema generation, while increasing flow rate would increase pressure and may cause a reduction in temperature (for example, if a heater in the beverage preparation system is not able to heat the increased flow of water flowing through).

The apparatus and methods of the present disclosure may allow for control of the beverage preparation machine requiring only a single interaction between the user and the machine, because only a single actuation of the activation element (preferably a single press of a button) is required to simultaneously initiate production of the beverage and indicate the user selection of their preferred operating mode. The apparatus and methods of the present disclosure may thereby limit user confusion and provide for simplified interaction compared to a device of the type providing multiple menu options, while still achieving a degree of personalisation of a beverage.

BRIEF DESCRIPTION OF THE DRAWINGS

The disclosure will now be described, by way of example only, in relation to the following non-limiting figures, in which.

DETAILED DESCRIPTION

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

The following description is directed to examples of the disclosure. The description of the examples is not meant to include all the possible embodiments that are claimed in the appended claims. Many modifications, improvements and equivalents which are not explicitly recited in the following embodiments may fall within the scope of the appended claims. Features described as part of one example or aspect may be combined with features of one or more other examples or aspects unless the context clearly requires otherwise.

Figure 1:
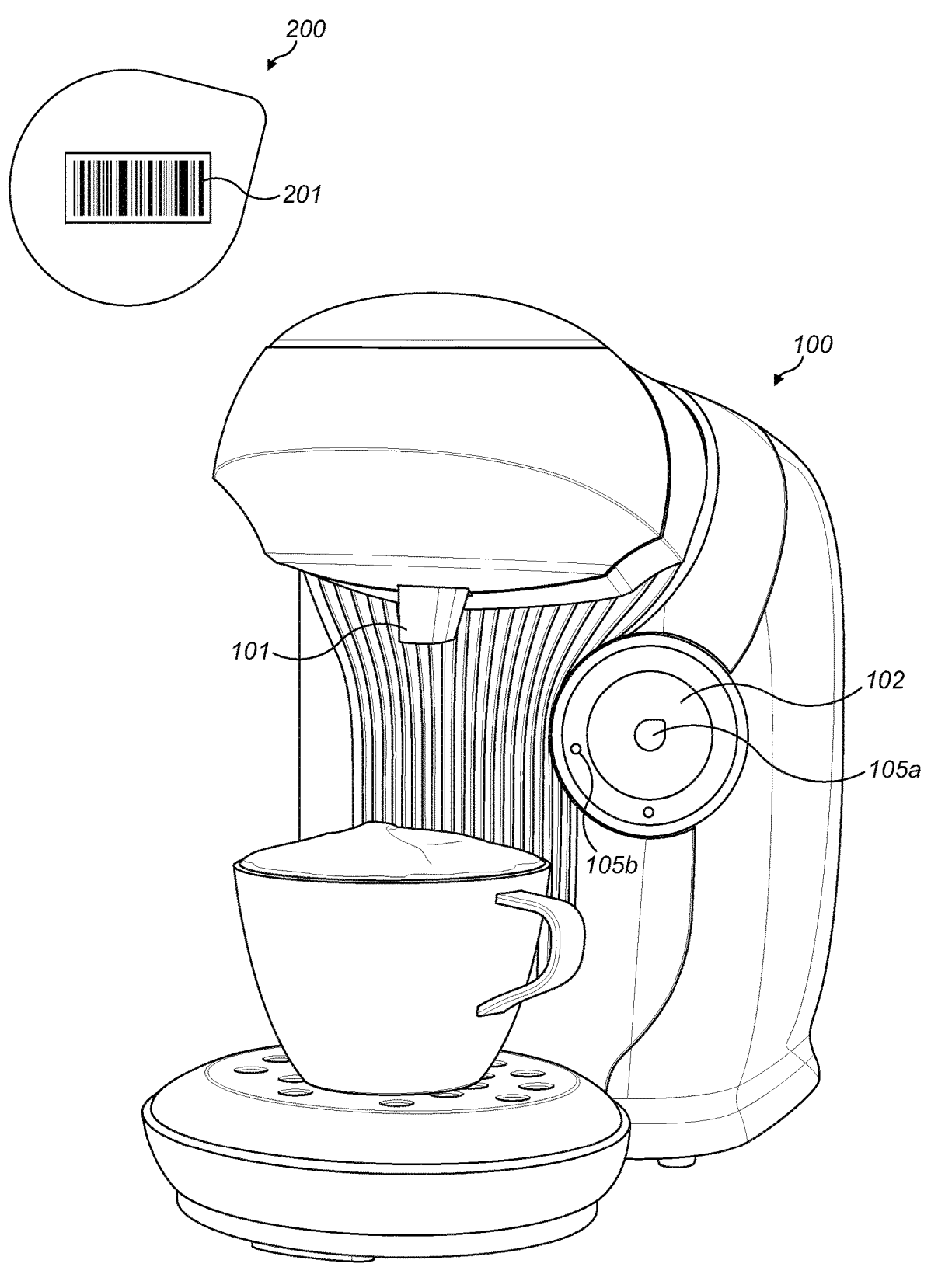
FIG. 1 is a schematic representation of a beverage preparation machine according to the present disclosure and a cartridge for use in the beverage preparation machine.
Figure 2:
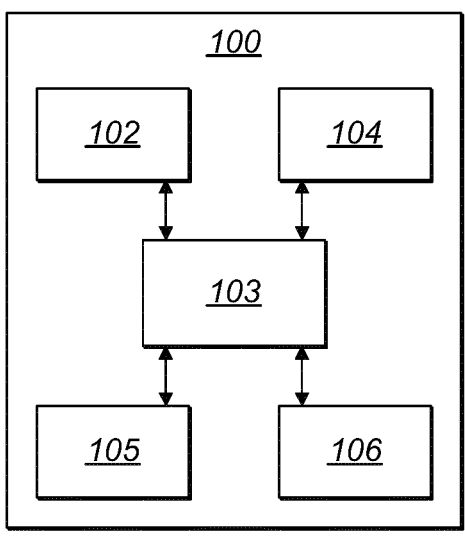
FIG. 2 is a schematic illustration of some components of the beverage preparation machine of FIG. 1.

As shown in FIGS. 1 and 2, the present disclosure provides a beverage preparation machine 100 comprising a brew head 101, an activation element 102 and a controller 103 configured to control operation of the beverage preparation machine 100 to prepare a beverage in response to actuation of the activation element 102. In the illustrated example, the activation element 102 is in the form of a single manually actuatable button and comprises the only user control element for the beverage preparation machine.

The brew head 101 is configured to receive, in use, a cartridge 200 of a type that comprises one or more beverage ingredients. The beverage preparation machine 100 is configured to produce the beverage from the beverage ingredients contained in the cartridge 200.

The beverage preparation machine 100 may be operated to produce the beverage in at least a first operating mode and a second operating mode. The controller 103 and the activation element 102 are configured such that the user may select the first operating mode by a first type of actuation of the activation element 102 and a second operating by a second type of actuation of the activation element. For example, the first operating mode may be selected by a short press of the button and the second operating mode may be selected by a long press of the button (or vice versa). A short press may for example have a duration of less than 3 seconds, optionally less than 2 seconds, optionally less than 1 second and a long press may have a duration of 3 seconds or greater, optionally of 5 seconds or greater.

In the first operating mode the beverage preparation machine 100 may be configured to produce a relatively weaker drink from the beverage ingredients provided in the cartridge 200. In the second operating mode the beverage preparation machine 100 may be configured to produce a relatively stronger (i.e. more intense) drink from the beverage ingredients provided in the cartridge 200.

The controller 103 is configured to receive the user selection to prepare the beverage using the first operating mode or the second operating mode and to control operation of a brewing apparatus 106 of the beverage preparation machine 100 prepare a beverage in response to the actuation of the activation element 102.

A code 201 is associated with the cartridge 200, for example in the form of a bar code printed on a lid or body of the cartridge. The code 201 may comprise information for identification of the type of cartridge 200 received in the brew head. The beverage preparation machine 100 comprises a code reader 104 for reading the code 201. The controller 103 may be configured to determine a standard set of brewing parameters by comparing the code 201 to a database comprising a standard set of brewing parameters for each of a variety of types of cartridge 200 for use in the beverage preparation machine 100. In the illustrated embodiment the code 201 is in the form of a bar code printed on the lid of the cartridge 200.

The controller 103 may be configured to command use of the first operating mode in response to a user selection of the first operating mode. The controller 103 may be configured to command use of the second operating mode in response to a user selection of the second operating mode.

The controller 103 may be configured to determine whether the one or more beverage ingredients of the cartridge 200 includes one or more roast and ground beverage ingredients based on the data obtained from reading the code 201 associated with the cartridge 200. The determination may be explicit, for example the code 201 may contain a flag or data bit that is used to signify that one or more roast and ground beverage ingredients are present. Alternatively, the determination may be implicit, for example the controller 103 may infer that one or more roast and ground beverage ingredients are present based on the state of other parameters derived from the code 201, e.g. the presence/length of a pre-wet and/or soak step. Alternatively, a database may comprise a list of capsule types for which the second operating mode can be used. The controller may be configured to de-activate the second operating mode when the controller 103 determines that the one or more beverage ingredients of the cartridge 200 does not include one or more roast and ground beverage ingredients such that the beverage is prepared using the first operating mode irrespective of the type of actuation of the activation element 102.

The controller 103 may be configured to determine whether the one or more beverage ingredients of the cartridge 200 includes one or more roast and ground beverage ingredients on insertion of the cartridge 200 into the brew head and prior to actuation of the activation element 102. Determining whether the one or more beverage ingredients of the cartridge 200 includes one or more roast and ground beverage ingredients may comprise comparing the code 201 associated with the cartridge 200 to the database. The database may comprise data indicating whether the type of cartridge 200 inserted in the brew head 101 contains roast and ground beverage ingredients, preferably roast and ground coffee.

In the first operating mode, the beverage is prepared using the standard set of brewing parameters obtained as described above. In the second operating mode the beverage is prepared using a modified set of brewing parameters based on, but modified compared to, the standard set of brewing parameters.

The process of brewing a beverage from beverage ingredients in a cartridge may include the following stages:

i. Pre-wetting, in which the cartridge is charged with liquid at a pre-wet temperature and pre-wet volume, resulting in wetting of the beverage ingredients contained in the cartridge;

ii. Soaking, in which the beverage ingredients soak in the liquid injected during the pre-wet stage for specified time (i.e. soak duration);

iii. Brewing, in which a further amount of liquid is passed through the cartridge to produce the beverage having a predetermined total in-cup volume; and iv. Purge.

The in-cup volume may comprise liquid in which the beverage ingredients is soaked in step ii and further liquid passed through the cartridge in step iii. Some liquid may remain in the cartridge after brewing. Volumes of liquid added to the cartridge may be adjusted accordingly to provide the required in-cup volume.

The modified set of brewing parameters used in the second operating mode may comprise one or more of:

a) a pre-wet temperature parameter that is increased compared to a pre-wet temperature parameter of the standard set of brewing parameters;

b) a soak duration parameter that is extended compared to a soak duration parameter of the standard set of brewing parameters;

c) a total in-cup volume parameter that is reduced compared to a total in-cup volume parameter of the standard set of brewing parameters.

The pre-wet temperature parameter of the modified set of brewing parameters may be from substantially 3° C. to substantially 8° C. higher than the pre-wet temperature of the standard set of brewing parameters. The pre-wet temperature parameter of the modified set of brewing parameters may be 98° C. The soak duration parameter of the modified set of brewing parameters may be 3 to 12 seconds, optionally 5 to 10 seconds, longer than the soak duration parameter of the standard set of brewing parameters. The total in-cup volume parameter of the modified set of brewing parameters may be 10% to 15% less than the total in-cup volume parameter of the standard set of brewing parameters. In any example, the beverage parameters may be adjusted such that the reduction in in-cup volume of a beverage produced by the second operating mode may be substantially at least 80%, at least 85%, or at least 90% of the volume of a beverage produced in the first operating mode. Increased soak duration, increased pre-wet temperature and/or limited reduction in the in-cup volume (via a limited reduction in the volume of liquid used) may result in an increase in soluble solids in the beverage, resulting in a more intense beverage.

Other brewing parameters may be unchanged compared to the standard set of brewing parameters. Optionally, a brewing temperature parameter and a brewing flow rate parameter may remain unchanged in the modified set of brewing parameters.

The beverage preparation machine 100 may comprise an indicator 105 for indicating whether the second operating mode is available for selection, for example if the controller 103 has determined that the cartridge 200 contains a roast and ground beverage ingredient. Additionally or alternatively, the indicator 105 may indicate whether the second operating mode is in use during preparation of the beverage. In the illustrated embodiment, the indicator 105 is an led arranged on or adjacent to the activation element 103. The indicator 105 may be operated in various modes to provide other status information in addition to the availability of the second operating mode, for example an error status of the beverage preparation machine 100 or a maintenance need, e.g. for descaling of the beverage preparation machine 100.

Figure 3:
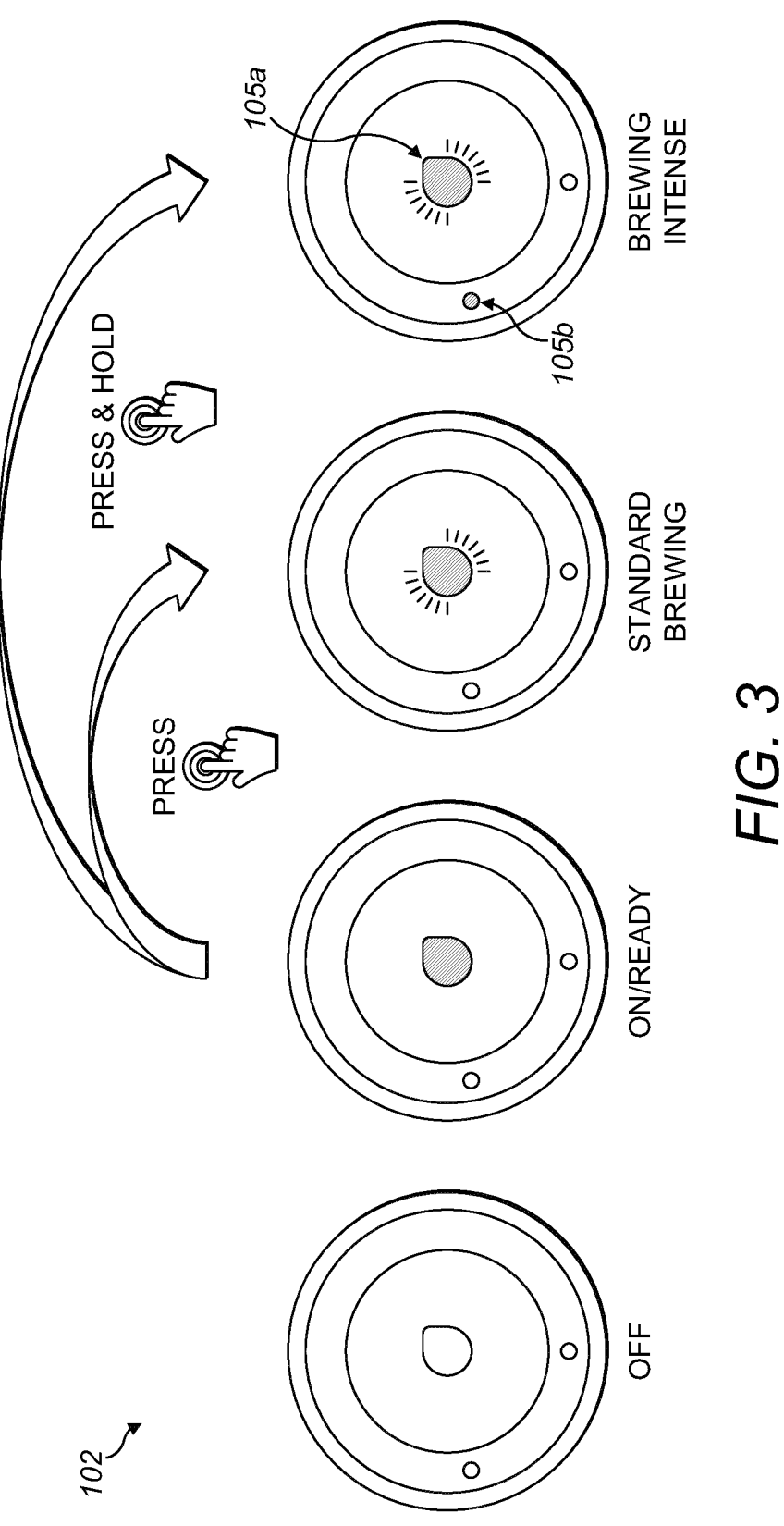
FIG. 3 is a schematic illustration of an indicator according to an aspect of the present disclosure in use.

An example showing an indicator 105 and an additional indicator 105a during an exemplary use of the beverage preparation machine is shown in FIG. 3, which shows indication elements 105a, 105b, arranged on and/or adjacent to an activation element 102, at various stages of the beverage preparation process. When the beverage preparation machine is "off", all indication elements may be off. When the beverage preparation machine is "on", an indication element 105a may be illuminated to indicate when the beverage preparation machine is ready to begin the brewing process (for example after insertion of a cartridge). If the first operating mode is initiated, the indication element 105a (which is an LED in the illustrated example) may flash to indicate that brewing is in progress. If the second operating mode is initiated, the indication element 105a may flash to indicate that brewing is in progress and a second indication element 105b may be illuminated to indicate that the modified brewing parameters are being used, for example to brew a more intense beverage. The indication elements 105a, 105b, may be other than as shown in the illustrated example (in which first indication element 105a is arranged on the activation element 102 and second indication element 105b is arranged adjacent to the activation element 102). In a further example, second indication element 105b may be arranged on the activation element 102 and first indication element 105a may be arranged adjacent to the activation element 102. Further additional indicators may be provided, for example to indicate a status or maintenance requirement of the machine such as descaling or an empty tank.

Figure 4:
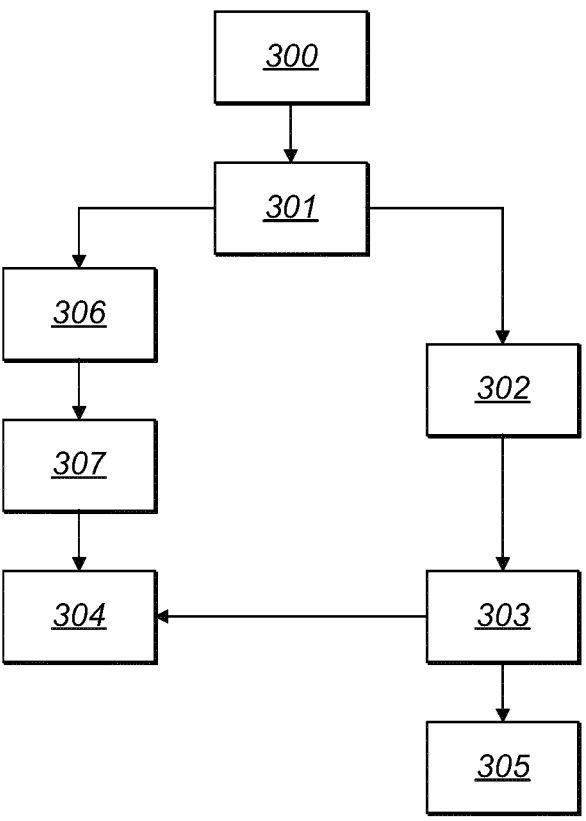
FIG. 4 is a schematic illustration of a method according to the present disclosure.

An example of a method of operating a beverage preparation machine according to the present disclosure is illustrated in FIG. 4. At step 300 a cartridge 200 is inserted into brew head 101 of the beverage preparation machine 100, the cartridge 200 being of a type that comprises one or more beverage ingredients and has a code 201 associated with the cartridge for determining a standard set of brewing parameters.

At step 301, on insertion of the cartridge 200 and prior to actuation of the activation element 102, the code 201 is read by the code reader 102 of the beverage preparation machine 100, and the controller 103 determines whether the one or more beverage ingredients of the cartridge 200 includes one or more roast and ground beverage ingredients based on data obtained from reading the code 201.

If the controller 103 determines that the one or more beverage ingredients of the cartridge 200 includes one or more roast and ground beverage ingredients, at step 302 the indicator 105 may optionally indicate that the second operating mode is available to the user. At step 303 the controller 103 then receives the user selection from the activation element 103 commanding preparation of the beverage using the first operating mode or the second operating mode. The controller 103 then commands preparation of a beverage using the first operating mode (step 304) or the second operating mode (step 305) according to the user selection.

If the controller 103 determines that the one or more beverage ingredients of the cartridge 200 does not include one or more roast and ground beverage ingredients, the second operating mode is deactivated (step 306). At step 307 the controller 103 then receives the user selection from the activation element 103 commanding preparation of the beverage using the first operating mode or the second operating mode. The controller 103 then commands preparation of a beverage using the first operating mode (step 304) such that the beverage is prepared using the first operating mode irrespective of the user selection made using the activation element 103.

Figure 5:
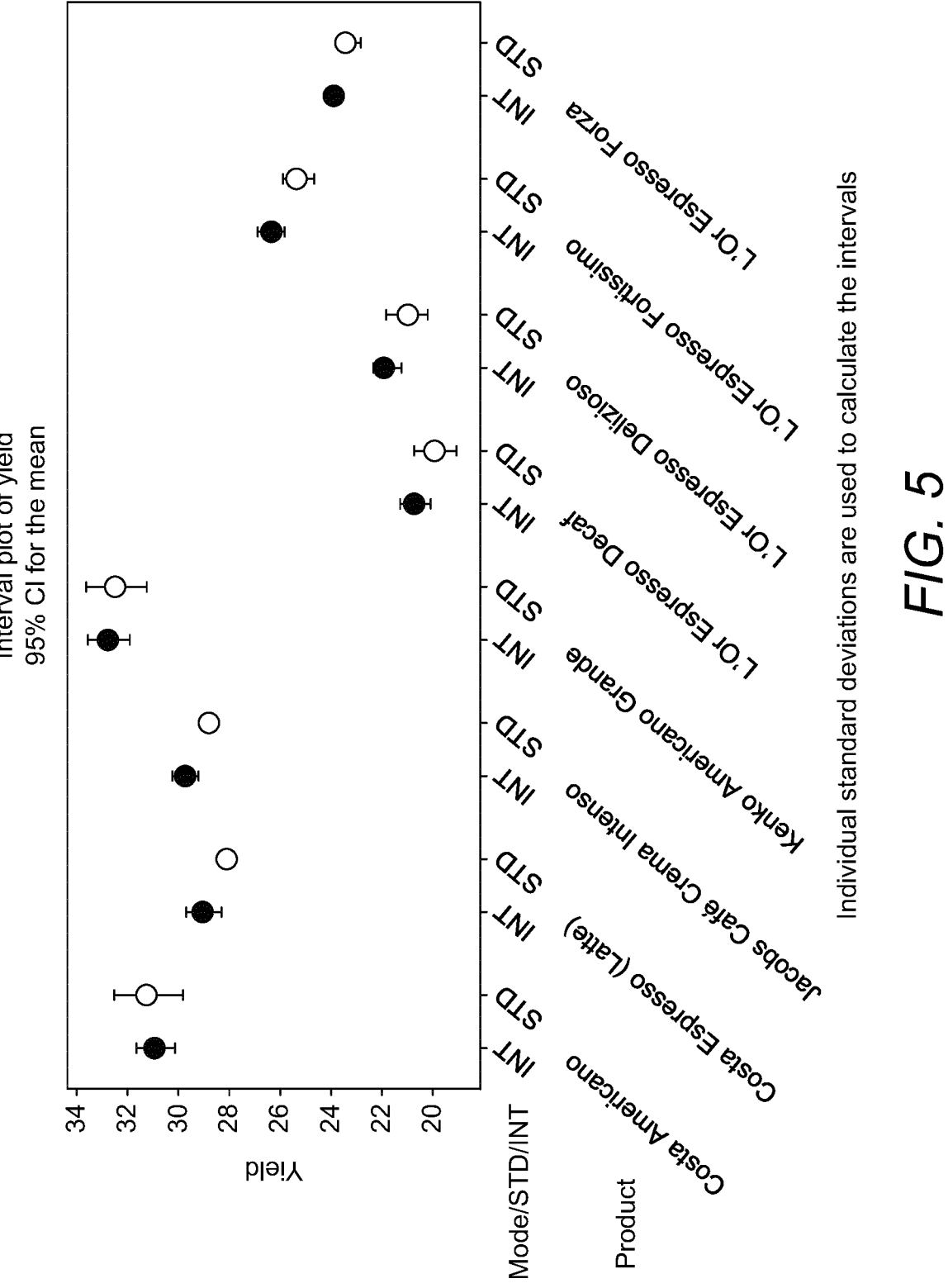
FIG. 5 illustrates experimental results showing differences in yield between standard and modified brewing parameters for various types of coffee.
Figure 6:
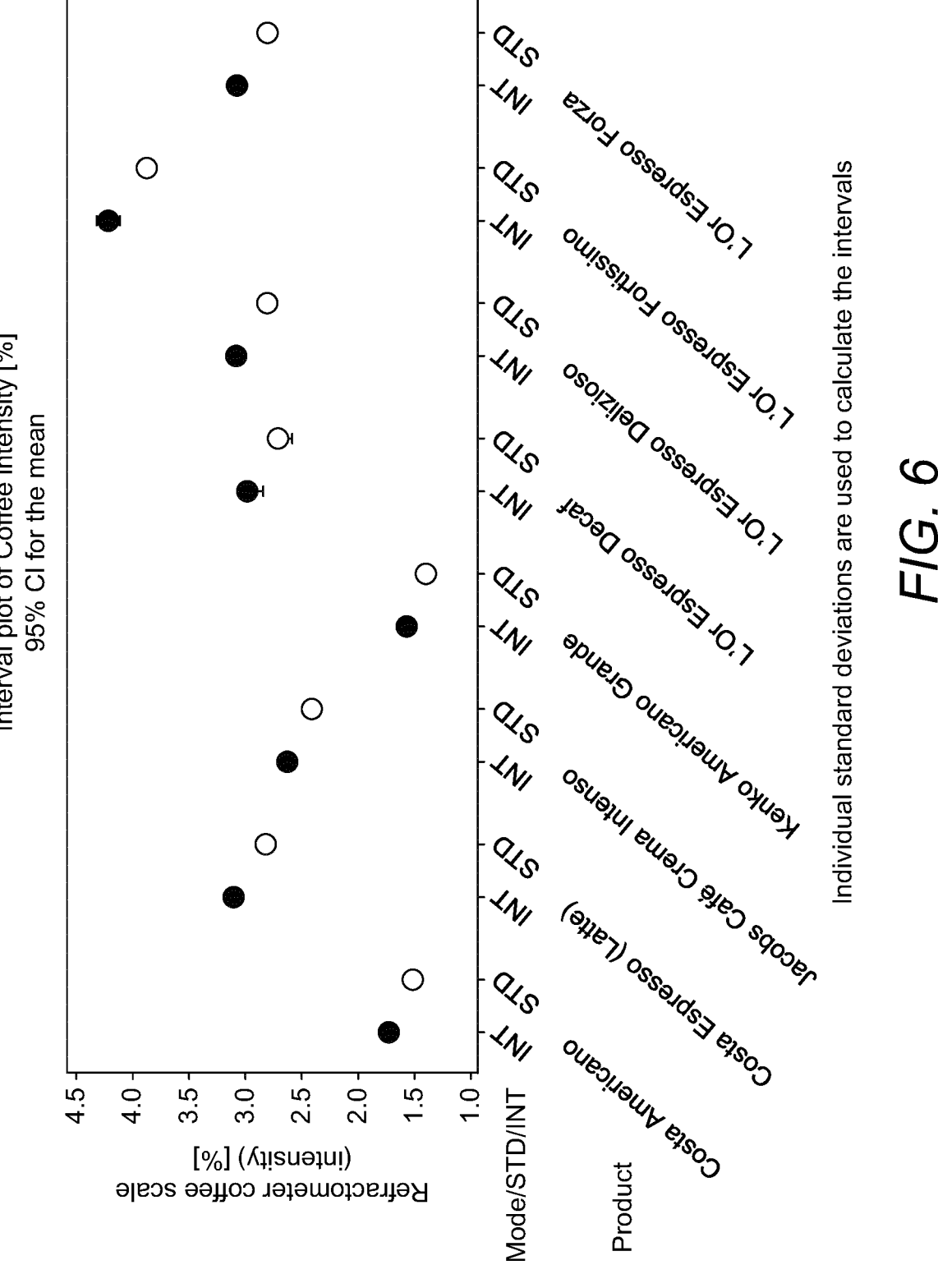
FIG. 6 illustrates experimental results showing differences in intensity between standard and modified brewing parameters for various types of coffee and FIG. 7 illustrates experimental results showing differences in drink weight between standard and modified brewing parameters for various types of coffee.
Figure 7:
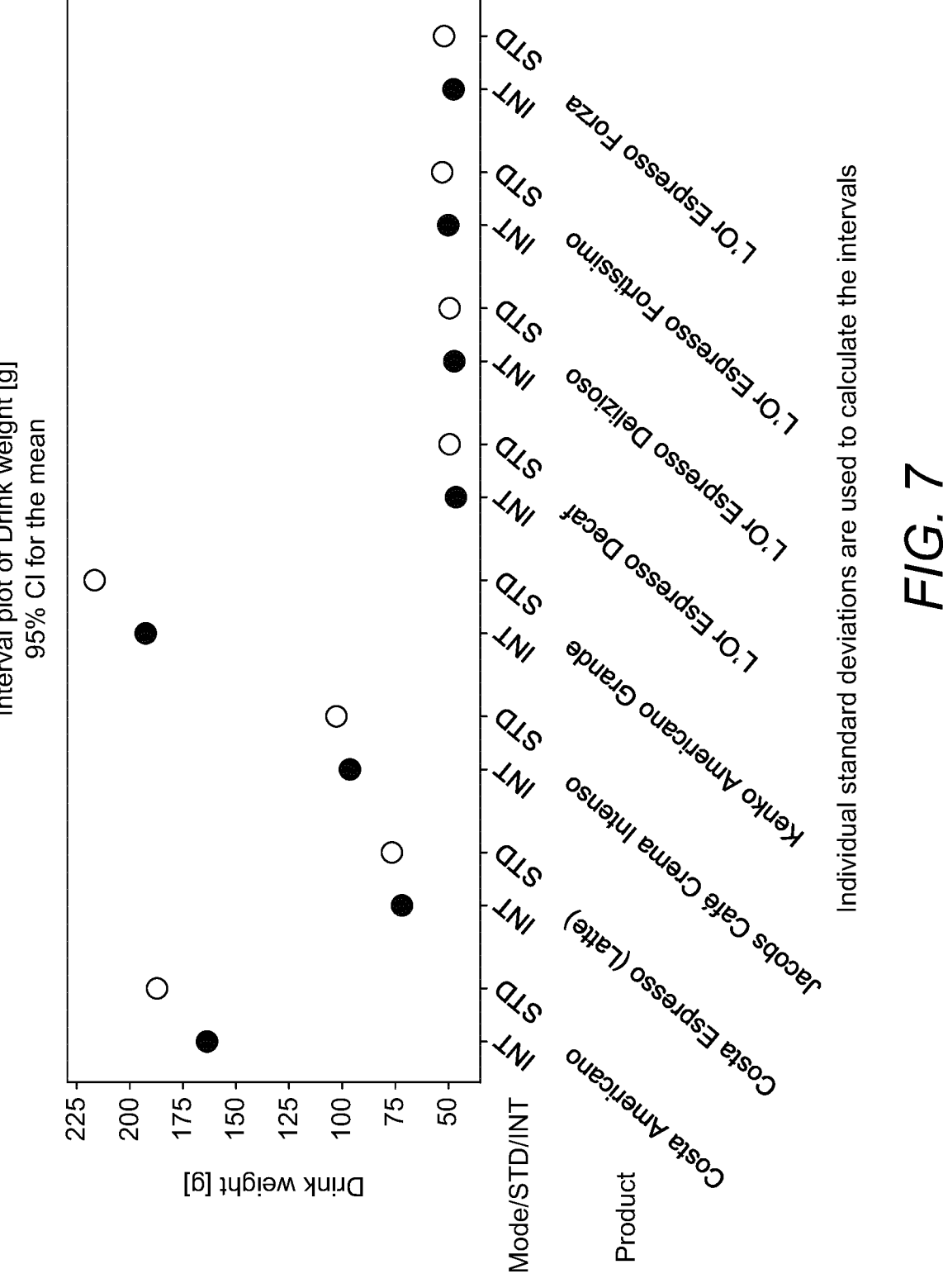

FIGS. 5 to 7 illustrate experimental examples of the application of the method according to the present invention using a variety of types of coffee. For each type a standard set of brewing parameters and a modified set of brewing parameters is defined as described above. FIG. 5 illustrates the yield produced using the first operating mode (labelled "STD") and second operating mode (labelled "INT"), The yield is calculated according to the following formula:

$$\text{Yield } (\%) = \text{Extracted Solids } (\%) \times \text{Drink Weight} / \text{Coffee Weight}$$

The yield values as shown in FIG. 5 illustrate that the increase in intensity is not solely related to a reduction in volume (drink weight) in the beverage. FIG. 6 illustrates the increase in intensity (given in % coffee solids in the beverage) achieved for each type of coffee using the first operating mode (labelled "STN") and second operating mode (labelled "INT"). FIG. 7 shows the drink weights of the beverages produced, illustrating that the modification of the beverage parameters does not result in a large reduction in in-cup volume.

FIGS. 5 to 7 therefore illustrate that an increase of intensity is achieved by using the modified set of brewing parameters, without a large reduction in in-cup volume.

Although preferred examples of the present disclosure have been described herein in detail, it will be understood by those skilled in the art that variations may be made thereto without departing from the scope of the appended claims.

The invention claimed is:

1. A beverage preparation machine comprising:
a brew head for receiving in use a cartridge, the cartridge being of a type that comprises one or more beverage ingredients and has a code associated with the cartridge for determining a standard set of brewing parameters;
a code reader;
an activation element; and
a controller configured to control operation of the beverage preparation machine to prepare a beverage from the one or more beverage ingredients of the cartridge in response to actuation of the activation element;
the controller being configured to receive a user selection to prepare the beverage using at least a first operating mode or a second operating mode;
in the first operating mode the beverage is prepared using the standard set of brewing parameters obtained at least in part from reading the code associated with the cartridge received in the brew head; and in the second operating mode the beverage is prepared using a modified set of brewing parameters based on, but modified compared to, the standard set of brewing parameters obtained at least in part from reading the code associated with the cartridge received in the brew head;
wherein the activation element comprises a single manually actuatable pushbutton, switch and/or button; and
the controller and the activation element are configured to permit user selection of the first operating mode by a first type of actuation of the activation element and the second operating mode by a second type of actuation of the activation element;
wherein the first type of actuation is a short press of the activation element and the second type of actuation is a long press of the activation element; and
wherein the controller is configured to de-activate the second operating mode when the controller determines that the one or more beverage ingredients of the cartridge does not include one or more roast and ground beverage ingredients such that the beverage is prepared using the first operating mode irrespective of the type of actuation of the activation element.

2. The beverage preparation machine of claim 1, wherein the controller is configured to determine whether the one or more beverage ingredients of the cartridge includes one or more roast and ground beverage ingredients based on data obtained from reading the code associated with the cartridge received in the brew head.

3. The beverage preparation machine of claim 1, wherein the controller is configured to determine whether the one or more beverage ingredients of the cartridge includes one or more roast and ground beverage ingredients on insertion of the cartridge into the brew head and prior to actuation of the activation element.

4. The beverage preparation machine of claim 1, wherein the activation element comprises an indicator for indicating whether the second operating mode is available for selection and/or is operative during preparation of the beverage.

5. The beverage preparation machine of claim 1, wherein the short press has a duration of less than 3 seconds, optionally less than 2 seconds, optionally less than 1 second and the long press has a duration of 3 seconds or greater, optionally 5 seconds or greater.

6. The beverage preparation machine of claim 1, wherein the modified set of brewing parameters comprises one or more of:
a) a pre-wet temperature parameter that is increased compared to a pre-wet temperature parameter of the standard set of brewing parameters;
b) a soak duration parameter that is extended compared to a soak duration parameter of the standard set of brewing parameters;
c) a total in-cup volume parameter that is reduced compared to a total in-cup volume parameter of the standard set of brewing parameters.

7. The beverage preparation machine of claim 6, wherein the pre-wet temperature parameter of the modified set of brewing parameters is from 3° C. to 8° C. higher than the pre-wet temperature of the standard set of brewing parameters.

8. The beverage preparation machine of claim 6, wherein the soak duration parameter of the modified set of brewing parameters is 3 to 12 seconds, optionally 5 to 10 seconds, longer than the soak duration parameter of the standard set of brewing parameters.

9. The beverage preparation machine of claim 6, wherein the total in-cup volume parameter of the modified set of brewing parameters is 10% to 15% less than the total in-cup volume parameter of the standard set of brewing parameters.

10. The beverage preparation machine of claim 6, wherein the modified set of brewing parameters comprises one or more of the following parameters that are unchanged compared to the standard set of brewing parameters:

brewing temperature parameter; and brewing flow rate parameter.

11. A method of operating a beverage preparation machine comprising the steps of:

a) inserting a cartridge into the beverage preparation machine, the cartridge being of a type that comprises one or more beverage ingredients and has a code associated with the cartridge for determining a standard set of brewing parameters;

b) receiving a user selection commanding preparation of a beverage using:

i) a first operating mode wherein the beverage is prepared using the standard set of brewing parameters obtained at least in part from the code associated with the cartridge; or ii) a second operating mode wherein the beverage is prepared using a modified set of brewing parameters that are based on, but modified compared to, the standard set of brewing parameters obtained at least in part from reading the code associated with the cartridge;

c) preparing the beverage using the first or the second operating mode;

wherein the user selection is received by actuating an activation element that comprises a single manually actuatable pushbutton, switch and/or button; and the first operating mode is selected by actuating the pushbutton, switch and/or button using a first type of actuation and the second operating mode is selected by actuating the same pushbutton, switch and/or button using a second type of actuation;

wherein the first type of actuation is a short press of the pushbutton, switch and/or button and the second type of actuation is a long press of the pushbutton, switch and/or button; and wherein the second operating mode is deactivated when the one or more beverage ingredients of the cartridge does not include one or more roast and ground beverage ingredients such that the beverage is prepared using the first operating mode irrespective of the user selection made using the activation element.

12. The method of claim 11, wherein the beverage preparation machine determines whether the one or more beverage ingredients of the cartridge includes one or more roast and ground beverage ingredients based on data obtained from reading a code associated with the cartridge.

13. The method of claim 11, wherein the beverage preparation machine determines whether the one or more beverage ingredients of the cartridge includes one or more roast and ground beverage ingredients on insertion of the cartridge and prior to actuation of the activation element.

14. The method of claim 11, wherein the modified set of brewing parameters comprises one or more of:

a) a pre-wet temperature parameter that is increased compared to a pre-wet temperature parameter of the standard set of brewing parameters;

b) a soak duration parameter that is extended compared to a soak duration parameter of the standard set of brewing parameters;

c) a total in-cup volume parameter that is reduced compared to a total in-cup volume parameter of the standard set of brewing parameters.

15. The method of claim 14, wherein the pre-wet temperature parameter of the modified set of brewing parameters is from 3° C. to 8° C. higher than the pre-wet temperature of the standard set of brewing parameters.

16. The method of claim 14, wherein the soak duration parameter of the modified set of brewing parameters is 3 to 12 seconds, optionally 5 to 10 seconds, longer than the soak duration parameter of the standard set of brewing parameters.

17. The method of claim 14, wherein the total in-cup volume parameter of the modified set of brewing parameters is 10% to 15% less than the total in-cup volume parameter of the standard set of brewing parameters.

18. The method of claim 14, wherein the modified set of brewing parameters comprises one or more of the following parameters that are unchanged compared to the standard set of brewing parameters:

brewing temperature parameter; and brewing flow rate parameter.

19. The method of claim 11, wherein the first operating mode prepares a brewed coffee beverage of a relatively weaker intensity and the second operating mode prepares a brewed coffee beverage of a relatively stronger intensity.

* * * * *